US009552397B2

(12) United States Patent
Klemm et al.

(10) Patent No.: US 9,552,397 B2
(45) Date of Patent: Jan. 24, 2017

(54) MECHANISM FOR COMPUTING AND USING CONTEXTUALIZED SOCIAL MEDIA SCORES

(71) Applicant: Avaya Inc., Santa Clara, CA (US)

(72) Inventors: Reinhard P. Klemm, Basking Ridge, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 365 days.

(21) Appl. No.: 14/305,636

(22) Filed: Jun. 16, 2014

(65) Prior Publication Data

US 2015/0261756 A1 Sep. 17, 2015

Related U.S. Application Data

(60) Provisional application No. 61/952,631, filed on Mar. 13, 2014.

(51) Int. Cl.
*G06F 17/30* (2006.01)
*H04L 12/58* (2006.01)

(52) U.S. Cl.
CPC ........... *G06F 17/3053* (2013.01); *H04L 51/32* (2013.01)

(58) Field of Classification Search
None
See application file for complete search history.

(56) References Cited

U.S. PATENT DOCUMENTS

| 2012/0011208 | A1* | 1/2012 | Erhart | G06Q 10/107 709/206 |
| 2012/0072358 | A1* | 3/2012 | Famous | G06Q 30/01 705/319 |
| 2012/0278115 | A1* | 11/2012 | Acharya | G06Q 30/02 705/7.13 |

* cited by examiner

*Primary Examiner* — Anh Tai Tran
(74) *Attorney, Agent, or Firm* — Sheridan Ross P.C.

(57) ABSTRACT

A social media network is monitored for postings of a control group. The control group is a group of one or more individuals that posts on a particular topic. The postings of the control group may cover all the postings of each member of the control group for a period of time. A first relative social media score is calculated for the postings of the control group on the social media network. A social media score is calculated for a social media posting of a user or entity on the social media network. The relative social media score for the control group is compared to the social media score for the user or entity to see if there is a significant difference. If there is a significant difference, an agent in a contact center to is identified respond to the social media posting of the user or entity.

20 Claims, 4 Drawing Sheets

MECHANISM FOR COMPUTING AND USING CONTEXTUALIZED SOCIAL MEDIA SCORES

CROSS REFERENCE TO RELATED APPLICATIONS

This application claims the benefit under 35 U.S.C. §119 (e) of U.S. Provisional Application No. 61/952,631, filed Mar. 13, 2014, entitled "MECHANISM FOR COMPUTING AND USING CONTEXTUALIZED SOCIAL MEDIA SCORES," the entire disclosure of which is incorporated herein by reference.

TECHNICAL FIELD

The systems and methods disclosed herein relate to contact centers and in particular to contact centers that deal with social media networks.

BACKGROUND

Customer behavior on social media networks is continuing to draw the attention of businesses. In particular, businesses are increasingly interested in monitoring social media posts both to the business' social media networks as well as monitoring social media posts by known customers, regardless of whether such posts are on the business' social media network. As social media continues to evolve, so too must a business' strategy for dealing with social media interactions.

Existing methods of monitoring and responding to social media interactions are primarily concerned with detecting a posting, classifying whether the posting requires a response from the business, and, if so, preparing an appropriate response. Unfortunately, the classification process for identifying whether to respond to a particular posting still has significant problems. Current solutions attempt to classify a posting primarily based on the content of the posting. This can result in unnecessary contact center resources being deployed for certain posts that do not necessarily require a response or, more problematically, may result in the failure to deploy resources for certain posts that should warrant a response. For example, a user may make a neutral post about a product. Using current classification processes, a response would likely not be generated. However, if the user's previous responses have been always highly favorable, failure to respond could result in decreased customer loyalty or even in the loss of a loyal customer.

SUMMARY

Systems and methods are provided to solve these and other problems and disadvantages of the prior art. A social media network is monitored for postings of a control group. The control group is a group of one or more individuals that posts on a particular topic, such as a product or service. The postings of the control group may cover all the postings of each member of the control group for a period of time. For example, the postings of the control group may be for a period of time after a new product was released. A first relative social media score is calculated for the postings of the control group on the social media network. A social media score is calculated for a social media posting of a user or entity on the social media network. The relative social media score for the control group is compared to the social media score for the user or entity to see if there is a significant difference. If there is a significant difference, an agent in a contact center is identified respond to the social media posting of the user or entity.

DETAILED DESCRIPTION

Figure 1:
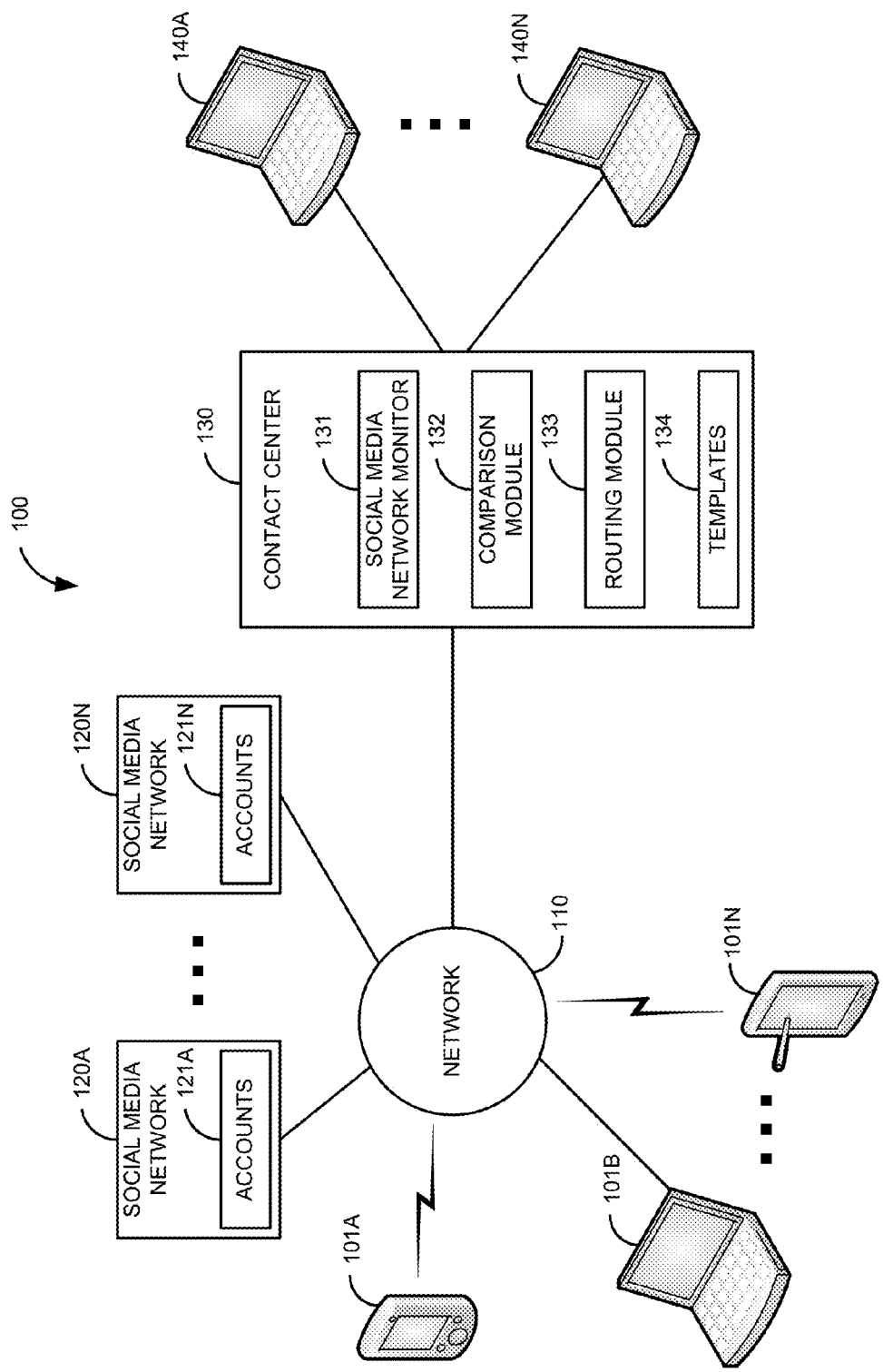
FIG. 1 is a block diagram of a first illustrative system for computing and comparing relative contextual scores.

FIG. 1 is a block diagram of a first illustrative system 100 for computing and comparing relative contextual scores. The first illustrative system 100 comprises communication devices 101A-101N, a network 110, social media networks 120A-120N, a contact center 130, and agent terminals 140A-140N.

The communication devices 101A-101N can be or may include be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to the network 110, including only a single communication device 101. In addition, the communication device 101 may be directly connected to the contact center 130.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, an Instant Messaging network, a email network, a combination of these, and the like. The network 110 can use a variety of protocols, such as Ethernet, Internet Protocol (IP), Session Initiation Protocol (SIP), Integrated Services Digital Network (ISDN), video protocols, Instant Messaging protocols, email protocols, and the like.

The social media networks 120A-120N can be any social network where a user and/or an entity can post or send information. For example, the social media network 120 can be Facebook®, Twitter®, Flickr®, LinkedIn®, Myspace®, a company social media network, a personal social medina network, and/or the like. A user such as a person can post information on the social media network 120. Likewise, an entity, such as a corporation, a partnership, a group, a business, an organization, and/or the like can post information on the social media network 120. As shown in FIG. 1, there may be any number of social media networks 120A-120N, including a single social media network 120.

Typically (although not required), the social media network 120 will have accounts 121 for individual users and/or entities. For example, the social media network 120A can have individual accounts 121A for all the users/entities that use the social media network 120A. Likewise, the social media network 120N can have accounts 121N for the individual users/entities of the social media network 120N.

A user or entity may have different accounts 121 on different social media networks 120. For example, a user or entity may have an account 121A on the social media network 120A and an account 121N on the social media network 120N Likewise, a corporation may have an account 121A on the social media network 120A and an account 121N on the social media network 120N.

The contact center 130 can be or may include any hardware/software that can manage contacts. The contact center 130 can manage a variety of contacts, such as voice contacts, video contacts, Instant Messaging contacts, email contacts, text contacts, and/or the like. The contact center 130 is responsible for routing contacts (either incoming and/or outgoing contacts) to agents at the agent terminals 140A-140N.

The contact center 130 further comprises a social network monitor 131, a comparison module 132, a routing module 133, and templates 134. The social media network monitor 131 can be or may include any hardware/software that can monitor information on the social media networks 120A-120N, such as a network crawler, a search engine, and/or the like. The comparison module 132 can be or may include any hardware/software that can compare information posted on and/or sent by the social media networks 120A-120N. The routing module 133 can be or include any hardware/software that can route communications, such as a switch, a Private Branch Exchange (PBX), a communication manager, an email server, a video switch, a router, an Instant Messaging server, a text messaging server, and/or the like.

The agent terminals 140A-140N can be or may include any device that allows an agent to communicate with the contact center 130, such as a Personal Computer (PC), a telephone, a video system, a cellular telephone, a Personal Digital Assistant (PDA), a tablet device, a notebook device, a combination of these, and the like.

Figure 2:
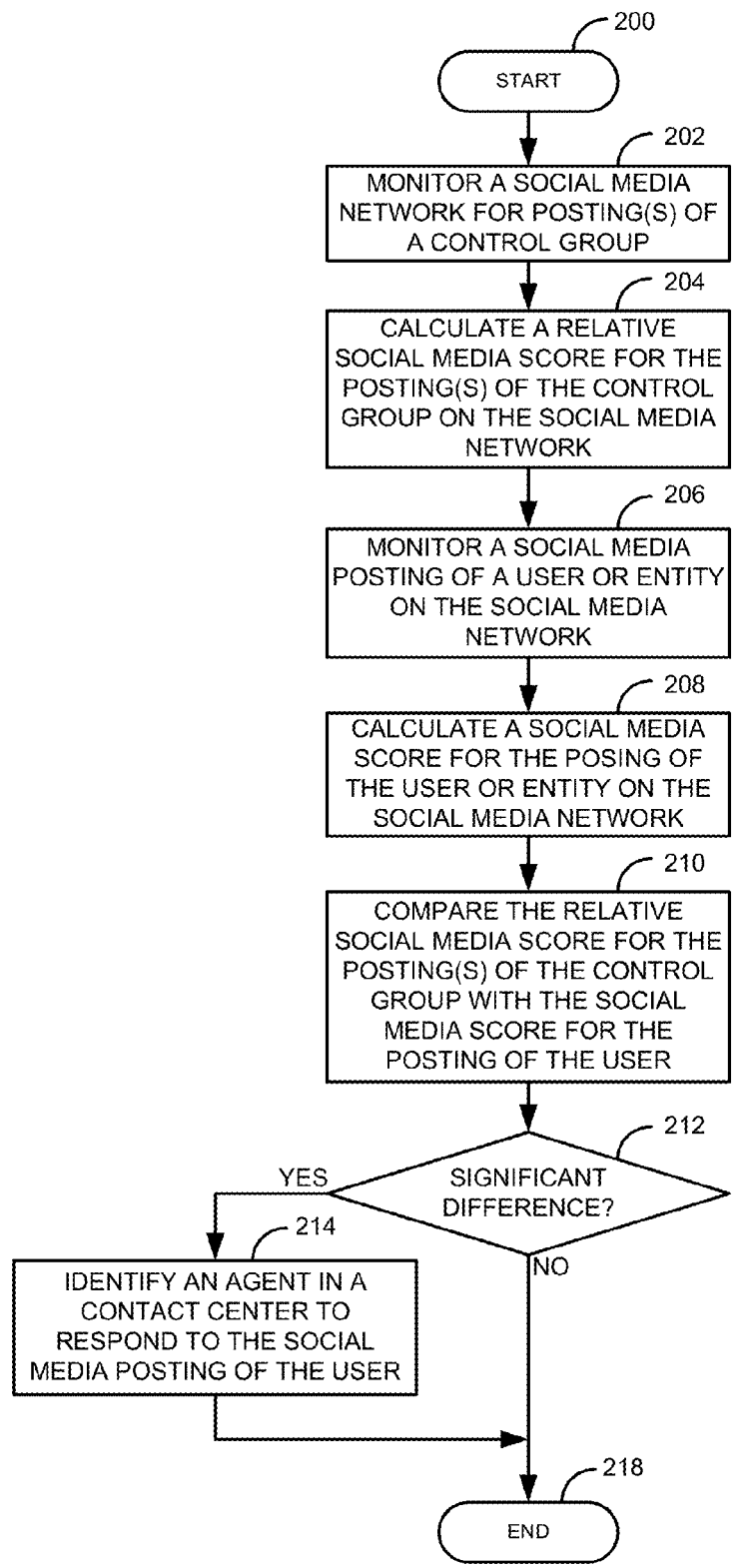
FIG. 2 is a flow diagram of a process for computing and comparing relative contextual scores.
Figure 3:
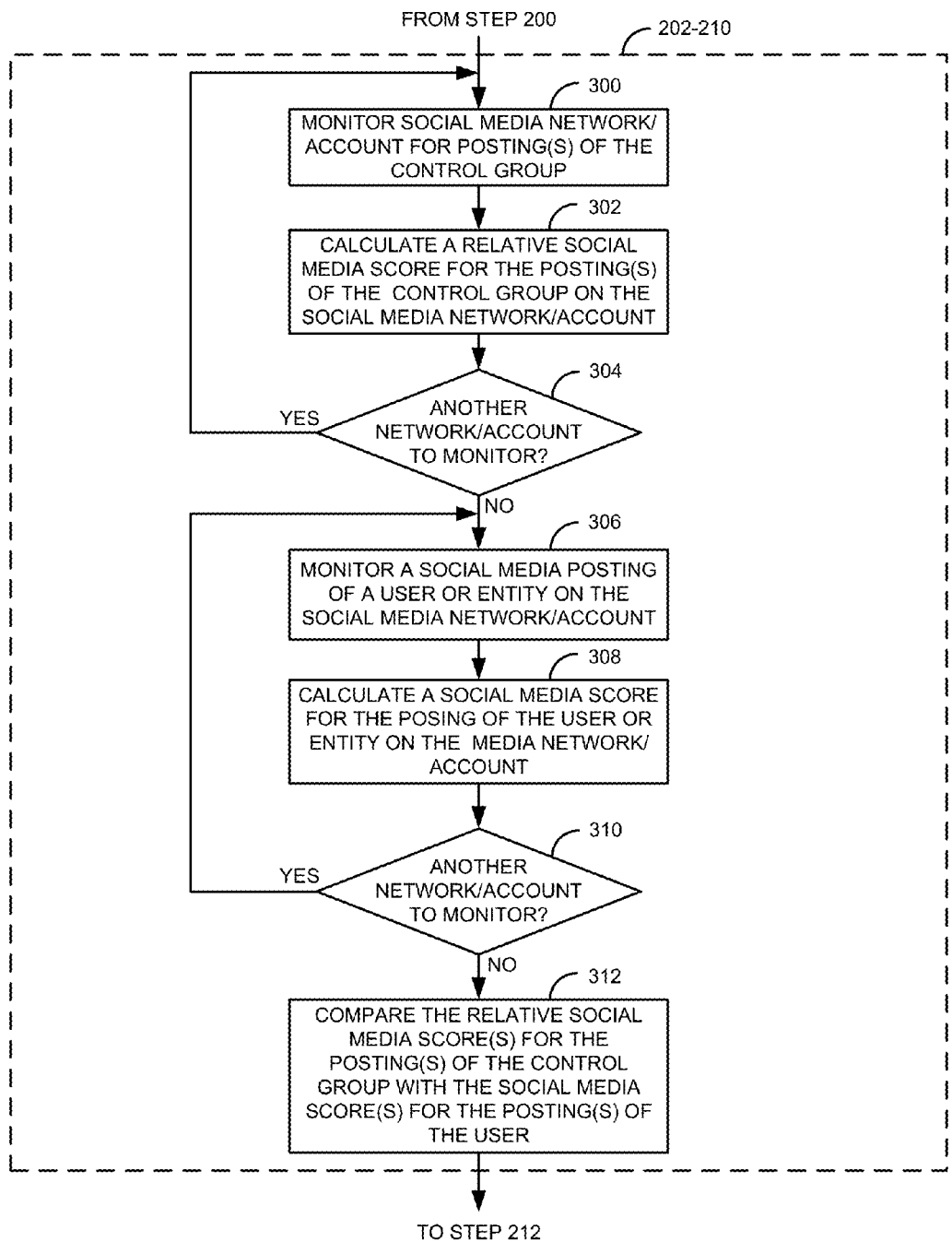
FIG. 3 is a flow diagram of a process for computing and comparing relative contextual scores on multiple social media networks and/or social media network accounts.
Figure 4:
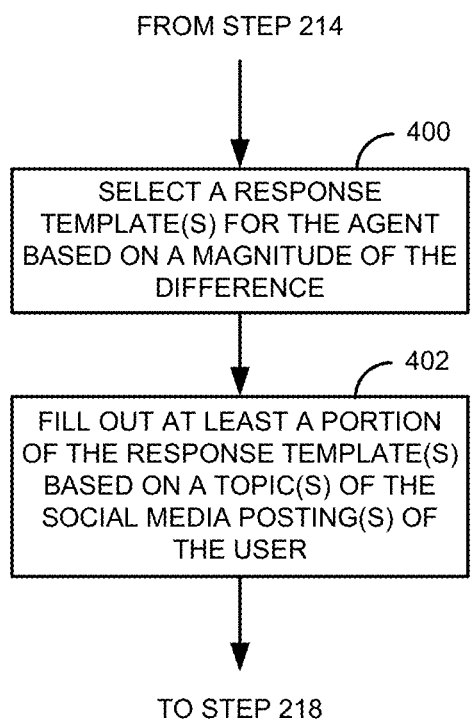
FIG. 4 is a flow diagram of a process for selecting a template for an agent based on a magnitude of compared contextual scores.

FIG. 2 is a flow diagram of a process for computing and comparing relative contextual scores. Illustratively, the communication devices 101A-101N, the network 110, the social media networks 120A-120N, the accounts 121A-121N, the contact center 130, the social media network monitor 131, the comparison module 132, the routing module 133, the templates 134, and the agent terminals 140A-140N are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The social media network monitor 131 monitors the social media network 120A for posting(s) of a control group in step 202. The postings of the control group are typically accomplished by users/entities of the control group via the communication devices 101A-101N. In one embodiment, the social media network monitor 131 may monitor the multiple social media networks 120A-120N and/or the accounts 121A-121N for postings of the control group. A control group can be a group of postings by a defined set of member(s). The members of the control group can consist of an individual, an entity, other individuals, other entities, a combination of these, and/or the like. If control group consists of an individual, the individual may be the same individual that is monitored in step 206 or a different individual. In another embodiment, the control group may be a different individual than is monitored in step 206. Alternatively, the control group can be a group of other users and/or entities that post on the social media network 120A.

The control group that the social media network monitor 131 uses to monitor the social media network 120A may be defined by an administrator. Likewise, the particular social media network or networks (the social media network 120A in this example) that are monitored may be defined by the administrator. The postings of the control group may be identified based on a time period (e.g., posts by members of the control group over a period of time). The control group may be limited to a specific social media network 120. The control group may be based on a customer profile, customers with similar profiles, customers that have posted on the same product or service, customers that have posted on the same social media network 120, customers that have posted on the same account 121, a combination of any of the above, and/or the like.

In one embodiment, the control group can be dynamically created. The control group can be dynamically created based on characteristics/subjects from the posting of the user or entity. For example, if the user or entity posts based on a specific product or service, the control group can be dynamically created based on prior posts of users who have previously posted on the same product or service. The dynamically created control group can be created based how a user has posted on a specific product or service. For example, the control group can be dynamically created based from users who were confused in using a specific option of a product.

The comparison module 132 calculates a relative social media score for the posting(s) of the control group on the social media network 120A in step 204. The relative social media score can be calculated in various ways. For example the use of one or more keywords/phrases can be used to calculate a relative social media score for each posting made by the member(s) of the control group. A total of the relative media scores for each of the postings of the control group can then be divided by the total number of postings by the control group to arrive at the relative social media score for the postings of the control group on the social media network 120A. For example, keywords such as dislike, hate, problem, fails, can be used to calculate a low or negative (depending on the scale used) relative social media score for a product, service, or topic. Conversely, keywords, such as like, love, wonderful, fantastic, can be used to calculate a high or positive relative social media score for the product, service, or topic.

The social media network monitor 131 monitors the social media network 120A for a posting of a user or entity on the social media network 120A in step 206. The comparison module 132 calculates a social media score for the posting of the user or entity on the social media network 120A in step 208. The calculation of the social media score for the posting of the user or entity may be accomplished in the same way that an individual score of a posting of a member of the control group is calculated. Alternatively, the calculation may be different.

The comparison module 132 compares the relative social media score for the posting(s) of the control group with the social media score for the posting of the user or entity in step 210. The comparison module 132 determines if there is a significant difference in step 212. A significant difference can be a value that is set by an administrator, can be default value, and/or the like. A significant difference can be a defined percentage. For example, the significant difference can be a 20% difference between the social media score for the posting of the user or entity versus the social media score for the control group. The significant difference can be defined differently depending upon the user or entity and/or the control group. Alternatively, the significant difference can be defined the same for all users/entities and control groups.

If there is a significant difference in step 212, the routing module 133 identifies an agent (e.g., at agent terminal 140A) in the contact center 130 to respond to the social media posting by the user or entity in step 214. The agent can be identified in various ways, such as by sending an email to the agent, by auto-dialing an agent so the agent can call the user or entity, by sending a text message to the agent, by setting up an Instant Messaging session with the user or entity and the agent, by setting up a video call between the user or entity, and the agent, and/or the like. The agent can be identified based on a particular skill set that the agent has in relation to the product, service, or topic. The agent can be identified based on the agent's ability to deal with specific types of customers, such as dissatisfied customers, difficult customers, repeat customers, good customers, and/or the like. The process then ends in step 218. Otherwise, if there is no significant difference in step 212, the process also ends in step 218.

To illustrate consider the following example. In this example, user A has previously posted comments on company A's social media network 120A. These posts were monitored by the social media network monitor 131 (step 202) and stored in a database (not shown). An administrator has defined the control group to include posts made only by user A. The administrator has also defined that all previous posts of user A on the social media network 120A over the last year are to be used to calculate the relative social media score for the postings of the control group. Over the last year, user A has made 100 posts on company A's social media network 120A.

The comparison module 132 has calculated a relative social media score of +9 (on a scale of −10 to +10) for the 100 posts by the user made over the last year in step 204. This indicates that user A has posted very positively in the past on company A's social media network 120A. The social media network monitor 131 monitors a posting by user A on the social media network 120A of company A in step 206. The comparison module 132 calculates a social media score for the posting of the user on the social media network 120A of company A in step 208. In this example, the social media score for the posting of the user is calculated to zero.

The comparison module 132 compares the relative social media score for the control group (+9) to the social media score for the posting of the user (0) in step 210. The comparison module 132 determines in step 212 that the difference (−9) is significant. In response to the significant difference, the routing module 133 identifies an agent in the contact center 130 (an agent at agent terminal 140A) to respond to the posting of the user on company A's social media network 120A. The agent at agent terminal 140A responds to the post and queries why the user has a relatively negative response in relation to the previous postings of the user.

The key advantage of using a relative social media score of the user's previous postings is that the system is able to identify a change in the user's response relative past responses by the user. Using traditional system, a posting that is calculated to be zero (average) would not be identified as being a problem (because the average of all posts is zero).

In a second example, the relative scores of other user's posts on the social media network 120A of company A are used for the control group. Company A has just released a new product one month ago. In this example, the comparison module 132 calculates the relative media score of the other users of the social media network 120A of company A as being a −2 for the last month in step 204. The social media network monitor 131 detects that the user has posted on the social media network 120A of company A. In this example, the social media score for the posting of the user is calculated in step 208 to be +8. The comparison module 132 compares the two scores (−2 and +8) in step 210 and determines that there is a significant difference (+10) in step 212. An agent is identified in step 214 to respond to the social media posting by the user to determine why the posting was so positive relative to the postings of the control group.

FIG. 3 is a flow diagram of a process for computing and comparing relative contextual scores on multiple social media networks 120 and/or social media network accounts 121. The process of FIG. 3 is an exemplary embodiment of step 202-210 in FIG. 2. The process described in steps 300-310 is shown serially. However, in another embodiment, steps 300-304 can be implemented in one thread and the process described in steps 306-310 be implemented in a second thread.

After the process starts in step 200, the social media network monitor 131 monitors the social media network 120 and/or an account 121 of the social media network 120 for posting(s) of the control group in step 300. The comparison module 132 calculates a relative social media score for the posting(s) of the control group on the social media network 120 and/or account 121 of the social media network 120 in step 302. The comparison module 132 determines if there is another social media network 120 and/or account 121 of the social media network 120 to monitor in step 304. If there is another social media network 120 and/or account 121 of the social media network 120 to monitor in step 304, the process goes to step 300 and monitors another social media network 120 and/or account 121 of the social media network 120. Otherwise, if there are no other social media networks 120 and/or accounts 121 of the social media network 120 to monitor, the process goes to step 306.

For example, Airline A may setup the system to monitor postings by the control group to Airline A's Facebook® account 121 and to monitor postings by the control group to Airline B's Facebook® account 121. In another embodiment, Airline A may setup the system to monitor posts by the control group to Airline A's Facebook® account 121 and to monitor postings by the control group Airline A's social media network 120. In another embodiment, Airline A may setup the system to monitor the posts of the user (the control group) on the user's Facebook® account 121 and to monitor the posts of the user (the control group) on the user's Twitter® account 121. In another embodiment, Airline A may setup the system to monitor the posts of the control group on Airline A's social media network 120 and Airline B's social media network 120. Likewise, various combinations of the above may be used.

The social media network monitor 131 monitors a posting of user or entity on the social media network 120 and/or an account 121 of the social media network 120 in step 306. The comparison module 132 calculates a social media score for the posting of the user or entity on the social media network 120 and/or the account 121 of the social media network 120 in step 308. The comparison module 132 determines if there is another social media network 120 and/or account 121 of the social media network 120 to monitor in step 310. If there is another social media network 120 and/or account 121 of the social media network 120 to monitor in step 310, the process goes to step 306. Otherwise, if there is not another social media network 120 and/or account 121 of the social media network 120 to monitor in step 310, the process goes to step 312.

For example, the social media network monitor 131 can monitor a posting of the user on Airline A's Facebook® account 121 and monitor a posting of the user on Airline B's Facebook® account 121 in a similar manner as described for the control group. In another embodiment, Airline A may setup the system to monitor posts by the user to Airline A's Facebook® account 121 and to monitor postings by the user on Airline A's social media network 120. In another embodiment, Airline A may setup the system to monitor the posts of the user on the user's Facebook® account 121 and to monitor the posts of the user on the user's Twitter® account 121. In another embodiment, Airline A may setup the system to monitor the posts of the user on Airline A's social media network 120 and Airline B's social media network 120. Likewise, various combinations of the above may be used.

The comparison module 132 compares the relative social media score(s) for the posting(s) of control group with the social media score(s) for the posting(s) of the user or entity. For example, if the social media network monitor 131 monitored the postings of the control group on Airline A's Facebook® account 121, the postings of the control group on Airline B's Facebook® account 121, the posting of the user on Airline A's Facebook® account 121, and the posting of the user on Airline B's Facebook® account 121, the comparison module 132 will compare the following: 1) the relative social media score for the posting(s) of the control group on Airline A's Facebook® account 121 to the social media score for the posting of the user on Airline A's Facebook® account 121, and 2) the relative social media score for the posting(s) of the control group on Airline B's Facebook® account 121 to the social media score for the posting of the user on Airline B's Facebook® account 121. The process then goes to step 212 and determines if there is a significant difference between either of the two compared scores.

In one embodiment, the control group used for one social media network 120 and/or account 121 of the social media network 120 may be a different control group than is used for a second social media network 120 and/or account 121. For example, the control group for Airline A's social media network 120 may be a different group than is used for the control group of Airline B's social media network 120. This can apply to any of the processes described herein.

In one embodiment, the social media posting of the user or entity on a first social media network 120/account 121 may be compared to a relative social media score for postings of the control group on a second social media network 120/account 121. For example, the social media score for user's post on social media network 120A can be compared to the relative social media score for the control group's postings on the social media network 120N.

In one embodiment, the social media postings of the user or entity on two different social media networks 120/accounts 121 are compared to the relative social media scores for postings of the control group (or different control groups) on different social media networks 120/accounts 121. For example, the social media score for user's post on the social media network 120A can be compared to the relative social media score for the control group's postings on social media network 120N. Likewise, the social media score for the user's post on the social media network 120N can be compared to the relative social media score for the control group's postings on the social media network 120A.

FIG. 4 is a flow diagram of a process for selecting a template 134 for an agent based on a magnitude of compared contextual scores. The process of FIG. 4 goes after step 214 of FIG. 2. After the routing module 133 has identified an agent in the contact center 130 in step 214, the routing module 133 selects one or more response templates 134 for the agent based on a magnitude of the difference in step 400. For example, using the scale described above (−10 to +10), a difference of +3 to +7 may cause a first template 134 to be selected. A difference of +8 to +15 may cause a second template 134 to be selected, and a difference of +16 to +20 may cause a third template 134 to be selected. Likewise, negative differences can cause different templates 134 to be selected. The various templates 134 for the positive differences may contain questions and hints for the agent regarding the magnitude of the positive changes. The template 134 for a negative difference may contain questions and hints for the agent regarding the magnitude of the negative response. This allows the agent to respond differently based on the magnitude of the response.

In one embodiment, multiple templates 134 may be selected. For example, if two social media postings of the user or entity on two different social media networks 120 and/or accounts 121 of the social media networks 120 are compared to two relative social media scores for the control group, two templates 134 may be selected, one for each posting. If the difference for the first post of the user or entity is positive and difference for the second post of the user or entity is negative, the two selected templates 134 may be selected to better deal with the positive or negative aspect of each respective posting.

In another embodiment, instead of identifying a single agent and selecting two templates 134, the process can identify two agents, one for each posting of the user or entity on the different social media networks 120 along with selecting a different template 134 for each agent.

In one embodiment, the routing module 133 can fill out at least a portion of the response template(s) 134 based on one or more topics of the social media posting(s) of the user or entity in step 402. For example, the routing module 133 can include part or all of the posting by the user or entity on the social media network 120 and/or account 121 of the social media network 120. The routing module 133 can tailor specific questions using the topic of the posting. The process then goes to step 218 of FIG. 2.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a contact center comprising:
calculating, by a processor, a first relative social media score for one or more postings of a first control group on a first social media network;
calculating, by the processor, a first social media score for a first social media posting of a user or entity on the first social media network;

comparing, by the processor, the first relative social media score for the one or more postings of the first control group with the first social media score for the first social media posting of the user or entity for a first difference; and in response to the first difference meeting or exceeding a predetermined difference threshold, identifying, by the processor, an agent in the contact center to respond to the first social media posting of the user or entity.

2. The method of claim 1, wherein the one or more postings of the first control group is a group of previous social media posts by the user or entity on the social media network.

3. The method of claim 1, wherein the one or more postings of the first control group is a group of previous social media posts by other users or entities.

4. The method of claim 1, wherein the first control group is defined based on at least one of a time period, the first social media network, a customer profile, customers with similar profiles, customers that have posted on the same product or service, customers that have posted on the same social media network, and customers that have posted on the same account.

5. The method of claim 1, wherein the first social media network comprises a plurality of social media networks and wherein calculating the relative social media score for the one or more postings of the first control group on the first social media network is also calculated based on the plurality of social media networks.

6. The method of claim 5, further comprising:
calculating a second relative social media score for one or more postings of the first control group on a second social media network;
calculating a second social media score for a second social media posting of the user or entity on the second social media network;
comparing the second relative social media score for the one or more postings of the first control group with the second social media score for the second social media posting of the user or entity for a second difference; and
in response to either the first difference or the second difference being significant, identifying the agent in the contact center to respond to either the first social media posting or the second social media posting of the user that has the significant difference.

7. The method of claim 6, wherein both the first difference and the second difference are significant and wherein the agent in the contact center is identified based on both the first difference and the second difference.

8. The method of claim 1, wherein the first social media posting of the user or entity is on a first account of the first social media network and further comprising:
calculating a second relative social media score for one or more postings of the first control group on a second account of the first social media network;
calculating a second social media score for a second social media posting of the user or entity on the second account of the first social media network;
comparing the second relative social media score for the one or more postings of the first control group with the second social media score for the second social media posting of the user or entity for a second difference; and
in response to either the first difference or the second difference being significant, identifying the agent in the contact center to respond to either the first social media posting or the second social media posting of the user that has the significant difference.

9. The method of claim 8, wherein both the first difference and the second difference are significant and wherein at least one of the following is true:
the first difference is positive and the second difference is negative;
the first difference is positive and the second difference is positive; and
the first difference is negative and the second difference is negative.

10. The method of claim 1, further comprising:
selecting a response template for the agent based a magnitude of the first difference; and
filing out at least a portion of the response template based on a topic of the first social media posting of the user or entity.

11. The method of claim 1, wherein the control group is dynamically created based on a characteristic or subject of the first social media posting of the user or entity.

12. A system for managing a contact center comprising:
a processor programmed to execute:
a comparison module configured to calculate a first relative social media score for one or more postings of a first control group on a first social media network, calculate a first social media score for a first social media posting of a user or entity on the first social media network, and compare the first relative social media score for the one or more postings of the first control group with the first social media score for the first social media posting of the user or entity for a first difference; and
a routing module configured to identify an agent in the contact center to respond to the first social media posting of the user or entity in response to the first difference meeting or exceeding a predetermined difference threshold.

13. The system of claim 12, wherein the one or more postings of the first control group is a group of previous social media posts by the user or entity on the social media network.

14. The system of claim 12, wherein the one or more postings of the first control group is a group of previous social media posts by other users or entities.

15. The system of claim 12, wherein the first social media network comprises a plurality of social media networks and wherein calculating the relative social media score for the one or more postings of the first control group on the first social media network is also calculated based on the plurality of social media networks.

16. The system of claim 15, wherein:
the comparison module is further configured to calculate a second relative social media score for one or more postings of the first control group on a second social media network, calculate a second social media score for a second social media posting of the user or entity on a the second social media network, and compare the second relative social media score for the one or more postings of the first control group with the second social media score for the second social media posting of the user or entity for a second difference; and
the routing module is further configured to identifying the agent in the contact center to respond to either the first social media posting or the second social media posting of the user that has the significant difference.

17. The system of claim 12, wherein the first social media posting of the user or entity is on a first account of the first social media network and wherein:

the comparison module is further configured to calculate a second relative social media score for one or more postings of the first control group on a second account of the first social media network, calculate a second social media score for a second social media posting of the user or entity on the second account of the first social media network, and compare the second relative social media score for the one or more postings of the first control group with the second social media score for the second social media posting of the user or entity for a second difference; and the routing module is further configured to identifying the agent in the contact center to respond to either the first social media posting or the second social media posting of the user that has the significant difference.

18. The system of claim 12, wherein the routing module is further configured to select a response template for the agent based a magnitude of the first difference and fill out at least a portion of the response template based on a topic of the first social media posting of the user or entity.

19. The system of claim 12, wherein the agent is identified based on a topic of the first social media posting of the user or entity and a magnitude of the first difference.

20. A method for managing a contact center comprising:

calculating, by a processor, a first relative social media score for one or more postings of a first control group on a first social media network;

calculating, by the processor, a first social media score for a first social media posting of a user or entity on a second social media network;

comparing, by the processor, the first relative social media score for the one or more postings of the first control group with the first social media score for the first social media posting of the user or entity for a first difference; and in response to the first difference meeting or exceeding a predetermined difference threshold, identifying, by the processor, an agent in the contact center to respond to the first social media posting of the user or entity.

* * * * *